July 19, 1927.
R. D. VALENTINE
1,636,397
SAFETY TRY COCK
Filed Aug. 20, 1925
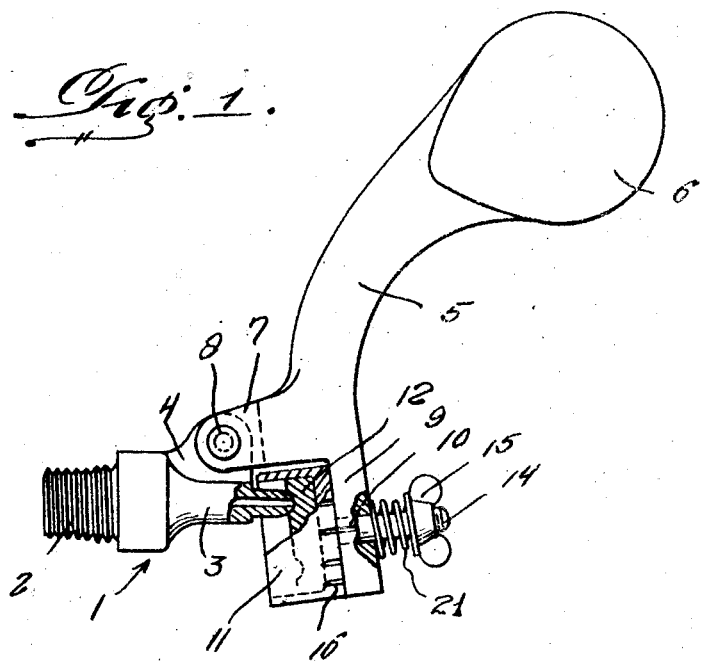
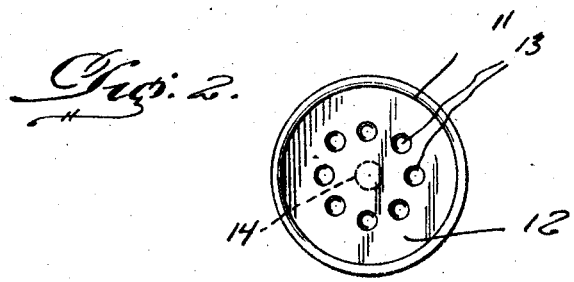
Inventor
R. D. Valentine, Patented July 19, 1927.

1,636,397

UNITED STATES PATENT OFFICE.

RICHARD D. VALENTINE, OF TULSA, OKLAHOMA.

SAFETY TRY COCK.

Application filed August 20, 1925. Serial No. 51,412.

This invention relates to improved try cocks for use on boilers and the like for determining the fluid level in the boiler, and consists in the safety try cock hereinafter described and definitely claimed.

In the accompanying drawings forming a part of this application and in which like numerals are employed to designate like parts throughout the same:

Figure 1 is a side view of a safety try cock constructed in accordance with the present invention with a portion broken away and shown in section to disclose the construction more plainly.

Fig. 2 is a detail view of a removable packing cup forming an important part of the invention.

Referring to the drawings in detail, the reference character 1 designates a body provided with a screw threaded nipple 2 adapted to be tapped into the end of the boiler in the usual way. The body includes a reduced longitudinally bored portion 3, the extremity of which is rounded to provide an efficient valve seat for compensating wear. This portion 3 is provided with an integral lug 4.

A novel closure is provided for the passage in said body and the closure comprises an arm 5 provided on its upper end with a relatively heavy counterbalance weight 6. It should be noted that the arm is longitudinally bowed and is provided between its ends with a pair of ears 7 which straddle and are pivotally connected at 8 to the lug 4. Below these ears is a circular head 9 which is provided with a central opening. In its periphery, the head is provided with a transverse notch 10 which serves a purpose to be hereinafter described.

Cooperating with this head is a metal cup 11 in which a rubber disk 12 is fitted. This disk is provided with a circular series of depressions 13 forming seats for reception of the rounded end of the part 3 of the cock. The cup 11 carries a stud 14 extending through the aperture in the head, and a thumb nut 15 is threaded on the end of the stud with a coiled spring 21 interposed between the nut and the head. The said spring 21 by exerting yielding pressure against the thumb nut 15 lessens the liability of casual movement of said nut 15.

Opposite each seat 13, the cup is formed with gauge grooves 16 adapted to be successively registered with the aforesaid notch 10. In use, the packing disk 12 may be turned to bring any one of the seats 13 into alinement with the rounded end of the valve cock. In this way the seats may be changed from time to time as wear takes place. The thumb nut 15 may be tightened against the spring to hold the seats in adjusted positions. The counter-balance weight 6 is disposed at a point with respect to the pivot to exert an inward pressure upon the packing disk to hold it in tight engagement with the valve cock for closing the passage. In adjusting the seats, one of the grooves 16 is brought into registry with the groove 10. The arm, together with the counter-balance weight constitutes a novel handle by means of which the valve closure may be swung away from the open end of the passage so as to allow escape of the fluid in the boiler.

A device constructed in accordance with the present invention possesses numerous features of advantage. For instance, the nipple 3 has a rounded end for cooperating with the closure valve so as not to cut the packing.

The valve has seats which will not leak or corrode, and these may be changed from time to time without the use of a wrench or other special tool. These seats will last from three to four months, including long wear and the entire ring, seat or disk may be replaced at very little cost.

There is very little or no danger of the fireman being burnt by hot water squirting out through the passage in the cock. This is true because the water is caught in the comparatively deep cup and deflected in a return direction. Moreover the cup is considerably larger than and surrounds the discharge end of the cock body in an efficient manner, and the packing disk is of a thickness considerably less than the depth of the cup to allow the flange in the cup to project beyond the packing to aid in acquiring this safety feature.

The device is so constructed in workmanship that it will stand almost any strain to which it is subject within reason and all parts are maintained in a manner to permit interchanging. These and other advantages and features of the invention have doubtless been made apparent from the following description and drawings.

Therefore a more lengthy description is thought unnecessary. While the preferred embodiment of the invention has been shown and described in detail, it is to be understood that minor changes coming within the field of invention claimed, may be resorted to if desired.

Having thus described my invention, what I claim as new is:—

In a cock and in combination, a body having a passage and also having a nipple, a gravitational swingable member pivotally connected at an intermediate point in its length to the said body and having a weighted arm and also having an arm in opposed relation to the nipple, the latter arm being apertured, a cup arranged at the side of said arm adjacent to the nipple and having a bottom wall and a side wall extending from said bottom wall toward the body and also having a stem extending through the aperture of the arm, a nut on said stem, a spring surrounding the stem and interposed between the nut and the arm, and packing means of less thickness than the depth of the cup arranged against the bottom wall of the cup and in opposed relation to the end of the nipple.

In testimony whereof I affix my signature.

RICHARD D. VALENTINE.